US011969932B2

(12) United States Patent  
Conrad

(10) Patent No.: US 11,969,932 B2  
(45) Date of Patent: Apr. 30, 2024

(54) PULLER APPARATUS WITH MOVABLE MOUNTING ARM

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 304 days.

(21) Appl. No.: 16/855,711

(22) Filed: Apr. 22, 2020

(65) Prior Publication Data

US 2020/0406324 A1    Dec. 31, 2020

Related U.S. Application Data

(60) Provisional application No. 62/866,326, filed on Jun. 25, 2019.

(51) Int. Cl.
*B29C 48/25* (2019.01)
*B21C 1/30* (2006.01)
(Continued)

(52) U.S. Cl.
CPC .............. *B29C 48/25* (2019.02); *B21C 1/305* (2013.01); *B29C 48/252* (2019.02);
(Continued)

(58) Field of Classification Search
CPC ..... B29C 48/355; B29C 70/52; B29C 70/525; B29C 48/25; B29C 70/527; B29C 48/266;
(Continued)

(56) References Cited

U.S. PATENT DOCUMENTS 2,692,421 A * 10/1954 Cozzo .................. B21D 1/00  
72/181  
3,431,599 A    3/1969 Fogelberg  
(Continued)

FOREIGN PATENT DOCUMENTS

CA      2900251 C    5/2018  
CN      1524677 A    9/2004  
(Continued)

OTHER PUBLICATIONS

English machine translation of WO9734759, published on Sep. 25, 1997.
(Continued)

*Primary Examiner* — Seyed Masoud Malekzadeh  
*Assistant Examiner* — Jennifer L Groux  
(74) *Attorney, Agent, or Firm* — Philip C. Mendes da Costa; BERESKIN & PARR LLP/S.E.N.C.R.L., s.r.l.

(57) ABSTRACT

A puller apparatus has a path through which an extrusion travels downstream from an outlet of an extruder and upper and lower extrusion puller members that define a portion of the path. At least one of the extrusion puller members is a drive member to provide forward motion to an extrusion. A mounting arm is moveably mounted to the puller apparatus at a mounting location. The mounting arm has a first portion on one side of the mounting location and a second portion on an opposed side of the mounting location. The upper extrusion puller member is mounted to the first portion of the mounting arm. The mounting arm is movable from a lowered position in which the upper extrusion puller member is positioned to engage an extrusion in the path and a raised position in which the upper extrusion puller member is spaced upwardly from the lowered position.

15 Claims, 4 Drawing Sheets

(51) Int. Cl.
  *B29C 48/355* (2019.01)
  *B29C 48/92* (2019.01)
  *B21C 35/02* (2006.01)
(52) U.S. Cl.
  CPC ............ *B29C 48/355* (2019.02); *B29C 48/92* (2019.02); *B21C 35/02* (2013.01)
(58) Field of Classification Search
  CPC ........ B29C 48/2665; B65H 2404/1521; B65H 2404/152; B65H 2404/1421; B65H 2408/23; B65H 29/12; B65H 29/20; B65H 18/26; B65H 2301/413; B65H 3/0684; B65H 20/04; B65H 2404/143; B65H 2404/144; B65H 2404/15212; B65H 51/02; B65H 51/04; B65H 51/08; B65H 51/10; B65H 51/105; B65H 51/12; B65H 51/14; B65H 5/06; B65H 5/062; B65H 5/068; B65H 20/02–08; B65H 2404/142–14212; B65H 29/125; B65H 2404/15; B65H 2404/7414; B65H 2301/44318; B65H 2301/4474; B65H 23/025; B65H 23/0251; B65H 23/038; B65H 23/16; B65H 23/26; B65H 23/1888; B30B 3/00; B21C 35/02; B21C 35/00; C21C 35/02
  See application file for complete search history.

(56) References Cited

U.S. PATENT DOCUMENTS

| | | | |
|---|---|---|---|
| 3,664,795 A | | 5/1972 | Schippers et al. |
| 3,728,058 A | | 4/1973 | Wheeler |
| 3,733,059 A | | 5/1973 | Pettit |
| 3,750,924 A | * | 8/1973 | Pepper .................. B65H 23/26 226/174 |
| 3,889,895 A | * | 6/1975 | Edes .................... B65H 23/063 242/422.2 |
| 4,070,951 A | * | 1/1978 | Bala ...................... B65H 20/24 493/24 |
| 4,094,940 A | | 6/1978 | Hold |
| 4,115,499 A | | 9/1978 | Salyer et al. |
| 4,130,275 A | * | 12/1978 | Rozga .................. B65H 29/12 271/251 |
| 4,277,182 A | | 7/1981 | Kruder |
| 4,290,986 A | | 9/1981 | Koschmann |
| 4,356,140 A | | 10/1982 | Kruder |
| 4,501,498 A | | 2/1985 | McKelvey |
| 4,554,851 A | | 11/1985 | Elhaus |
| 4,566,298 A | | 1/1986 | Elhaus |
| 4,628,719 A | | 12/1986 | Best |
| 4,721,589 A | | 1/1988 | Harris |
| 5,282,915 A | * | 2/1994 | Westlake, Jr. ........ B29C 48/914 156/244.11 |
| 5,312,573 A | | 5/1994 | Rosenbaum et al. |
| 5,358,327 A | | 10/1994 | Derezinski et al. |
| 5,500,175 A | * | 3/1996 | Bradt ...................... B29B 9/02 264/171.23 |
| 5,542,836 A | * | 8/1996 | Gross ..................... B29C 48/08 425/141 |
| 5,800,765 A | * | 9/1998 | Bradt .................... B29C 48/35 264/282 |
| 5,823,464 A | * | 10/1998 | Bohn .................... B65H 39/16 226/189 |
| 7,275,583 B2 | | 10/2007 | Eisen |
| 9,808,971 B2 | | 11/2017 | Fitzpatrick |
| 2003/0030166 A1 | | 2/2003 | Eiva |
| 2008/0111016 A1 | * | 5/2008 | Ackerman ........ B65H 23/1888 242/416 |
| 2008/0217817 A1 | | 9/2008 | McCullough |
| 2009/0101686 A1 | * | 4/2009 | Lane ..................... B65H 23/02 226/34 |
| 2010/0295199 A1 | | 11/2010 | Zhang et al. |
| 2010/0301513 A1 | * | 12/2010 | Hanson ................. B29C 48/08 425/114 |
| 2011/0086150 A1 | | 4/2011 | Plattner et al. |
| 2011/0247917 A1 | * | 10/2011 | Matsuda ................ B29C 48/12 198/586 |
| 2012/0091654 A1 | * | 4/2012 | Hagos ................... B65H 5/062 271/272 |
| 2013/0287465 A1 | * | 10/2013 | Turner ................ B65H 23/188 400/618 |
| 2016/0200024 A1 | | 7/2016 | Kim et al. |
| 2016/0279854 A1 | | 9/2016 | Fitzpatrick |

FOREIGN PATENT DOCUMENTS

| | | |
|---|---|---|
| CN | 101890792 A | 11/2010 |
| CN | 203357855 U | 12/2013 |
| EP | 839631 A2 | 5/1998 |
| JP | 57159634 A | 10/1982 |
| JP | 59017916 U | 2/1984 |
| JP | 63031731 A | 2/1988 |
| JP | 63203313 A | 8/1988 |
| JP | 01317736 A | 12/1989 |
| JP | 2014184647 A | 10/2014 |
| WO | 9734759 A2 | 9/1997 |

OTHER PUBLICATIONS

English machine translation of CN1524677, published on Sep. 1, 2004.
English machine translation of JP01317736, published on Dec. 22, 1989.
English machine translation of JP2014184647, published on Oct. 2, 2014.
English machine translation of the Abstract of JPS63203313; published on Aug. 23, 1988.
English machine translation of CN101890792; published on Nov. 24, 2010.
English machine translation of CN203357855, published on Dec. 25, 2013.
English machine translation of the Abstract of JP63031731, published on Feb. 10, 1988.
English machine translation of the Abstract of JP59017916, published on Feb. 3, 1984.
English machine translation of JP57159634, published on Oct. 1, 1982.

* cited by examiner

PULLER APPARATUS WITH MOVABLE MOUNTING ARM

CROSS-REFERENCE TO RELATED APPLICATIONS

This application claims the benefit of the filing date of U.S. Provisional Application Ser. No. 62/866,326, filed Jun. 25, 2019, the content of which in incorporated herein by reference.

FIELD

This application relates to a puller apparatus for pulling an extrusion profile as it emerges from an extruder.

INTRODUCTION

Extrusion is a process used to manufacture items having a fixed cross-sectional profile. Known extruders typically push material through a die having the desired cross-sectional profile. End products of the extrusion process are commonly called "extrudates". For example, extrudates can include metals, polymers, concrete, ceramics, etc.

Known puller apparatuses typically pull the extrusion profile as it emerges from the outlet of an extruder. An extrudate may be cooled as it passes through a track of a puller apparatus after the extrudate emerges from the outlet of the extruder. Puller apparatuses may also be used to transfer the extrusion profile to a processing station downstream of the extruder.

SUMMARY

This summary is intended to introduce the reader to the more detailed description that follows and not to limit or define any claimed or as yet unclaimed invention. One or more inventions may reside in any combination or subcombination of the elements or process steps disclosed in any part of this document including its claims and figures.

In accordance with a broad aspect of this disclosure, a puller apparatus for pulling an extrusion profile as it emerges from an extruder is provided. As disclosed herein, a puller apparatus may comprise:
  (a) a path through which an extrusion travels downstream from an outlet of an extruder;
  (b) an upper extrusion puller member and a lower extrusion puller member defining a portion of the path wherein at least one of the extrusion puller members is a drive extrusion puller member, the drive extrusion puller member providing forward motion to an extrusion travelling through the path; and
  (c) a mounting arm moveably mounted to the puller apparatus, the mounting arm having a mounting location at which location the mounting arm is moveably mounted to the puller apparatus, the mounting arm having a first portion on one side of the mounting location and a second portion on an opposed side of the mounting location.

In some embodiments, the upper extrusion puller member may be mounted to the first portion of the mounting arm.

In some embodiments, the mounting arm may be moved from a lowered position in which the upper extrusion puller member is positioned to engage an extrusion in the path and a raised position in which the upper extrusion puller member is spaced upwardly from the lowered position.

In some embodiments, the first portion may travel upwardly and forwardly as the first portion travels from the lowered position to the raised position.

In some embodiments, during operation the mounting arm may be freely moved between the lowered position and the raised position.

In some embodiments, the puller apparatus may remain in the lowered position when no external force is supplied to the mounting arm.

In some embodiments, during operation the mounting arm may be moved between the lowered position and the raised position merely by applying a downward force to the second portion of the mounting arm.

In some embodiments, the mounting arm may be pivotally mounted to the puller apparatus.

In some embodiments, the puller apparatus may further comprise a counterweight provided on the second portion of the mounting arm. In such embodiments, the counterweight counters the weight of the first portion of the mounting arm. The weight of the first portion of the mounting arm may be provided in part by the upper extrusion puller member.

In some embodiments, one or more of the following may be varied to vary the downward force provided by the puller assembly (1) the weight of the counterweight may be varied, for example, it may be increased or decreased as may be required to advance an extrudate, (2) the position of a weight, such as the counterweight on the second portion of the mounting arm, may be adjusted, (3) an additional weight may be provided on the mounting arm to vary the downward force, (4) an alternate counterweight may be positioned on the mounting arm to vary the downward force and, (5) the position of the mounting location may be varied.

In some embodiments, the second portion of the mounting arm may provide a downward force.

In some embodiments, a counterweight provided on the second portion may provide the downward force.

In some embodiments, the position of the mounting location may determine the lowered position.

In some embodiments, the puller apparatus may further comprise a biasing member biasing the mounting arm to the lowered position. The biasing member may be a spring or an elastic chord.

In some embodiments, the puller apparatus may further comprise a stop member comprising a stop. In such embodiments, the stop may determine the lowered position.

In some embodiments, the position of the stop may be adjusted.

In some embodiments, the upper extrusion puller member may be the drive extrusion puller member.

In some embodiments, a drive motor may be mounted to an upper extrusion puller member assembly. The upper extrusion puller member assembly may include a motor control for controlling operation of the drive motor and/or a gearbox.

In some embodiments, the upper extrusion puller member may comprise a roller.

It will be appreciated by a person skilled in the art that a method or apparatus disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

Figure 1A:
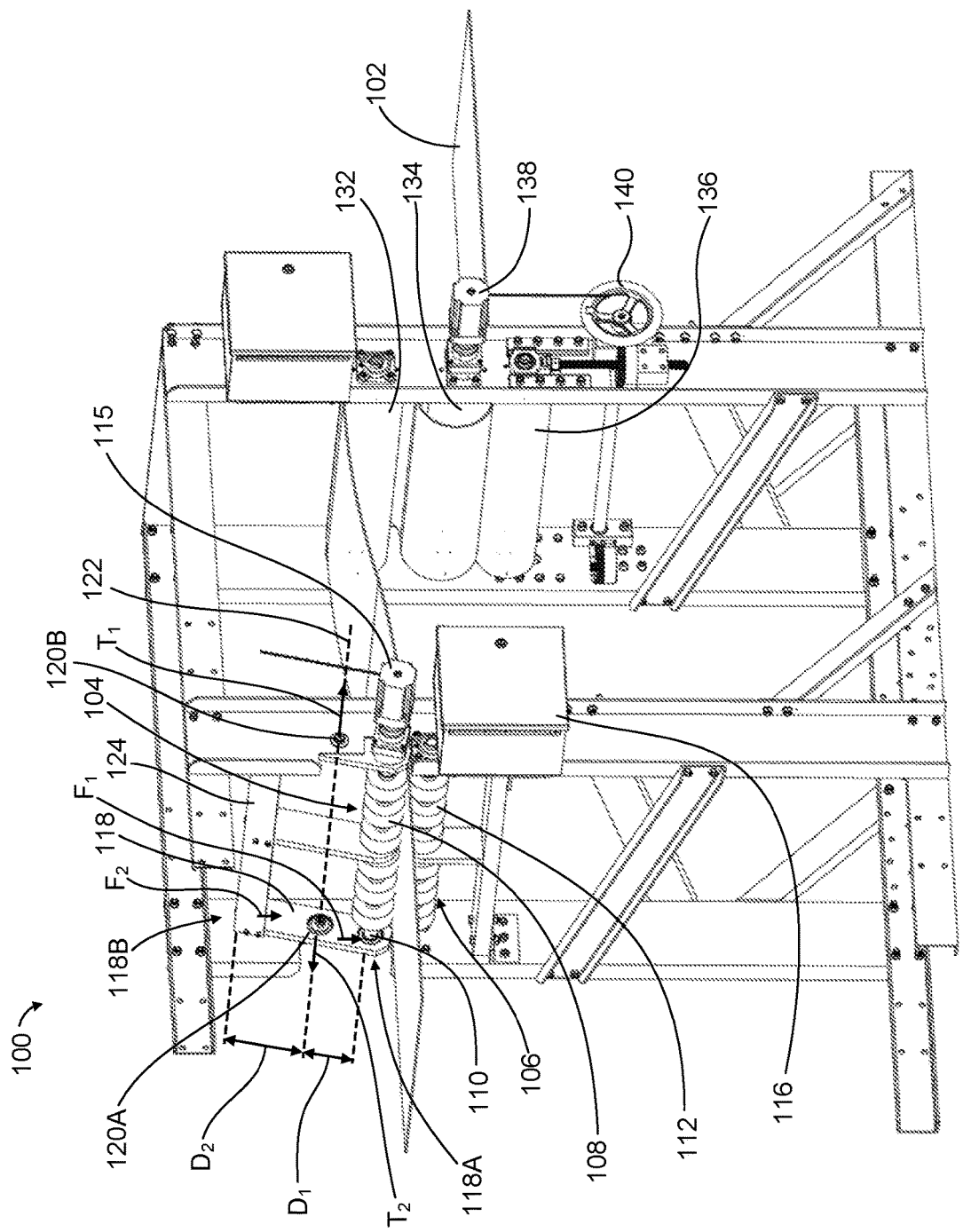
FIG. 1A is a side perspective view of a puller apparatus in accordance with an embodiment, with a mounting arm in a lowered position.

The drawings included herewith are for illustrating various examples of articles, methods, and apparatuses of the teaching of the present specification and are not intended to limit the scope of what is taught in any way.

DETAILED DESCRIPTION

Various apparatuses and methods are described below to provide an example of an embodiment of each claimed invention. No embodiment described below limits any claimed invention and any claimed invention may cover apparatuses and methods that differ from those described below. The claimed inventions are not limited to apparatuses and methods having all of the features of any one apparatus or method described below or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

The terms "an embodiment," "embodiment," "embodiments," "the embodiment", "the embodiments", "one or more embodiments", "some embodiments", and "one embodiment" mean "one or more (but not all) embodiments of the present invention(s)", unless expressly specified otherwise.

The terms "including", "comprising", and variations thereof mean "including but not limited to", unless expressly specified otherwise. A listing of items does not imply that any or all of the items are mutually exclusive, unless expressly specified otherwise. The terms "a", "an", and "the" mean "one or more", unless expressly specified otherwise.

Figure 1B:
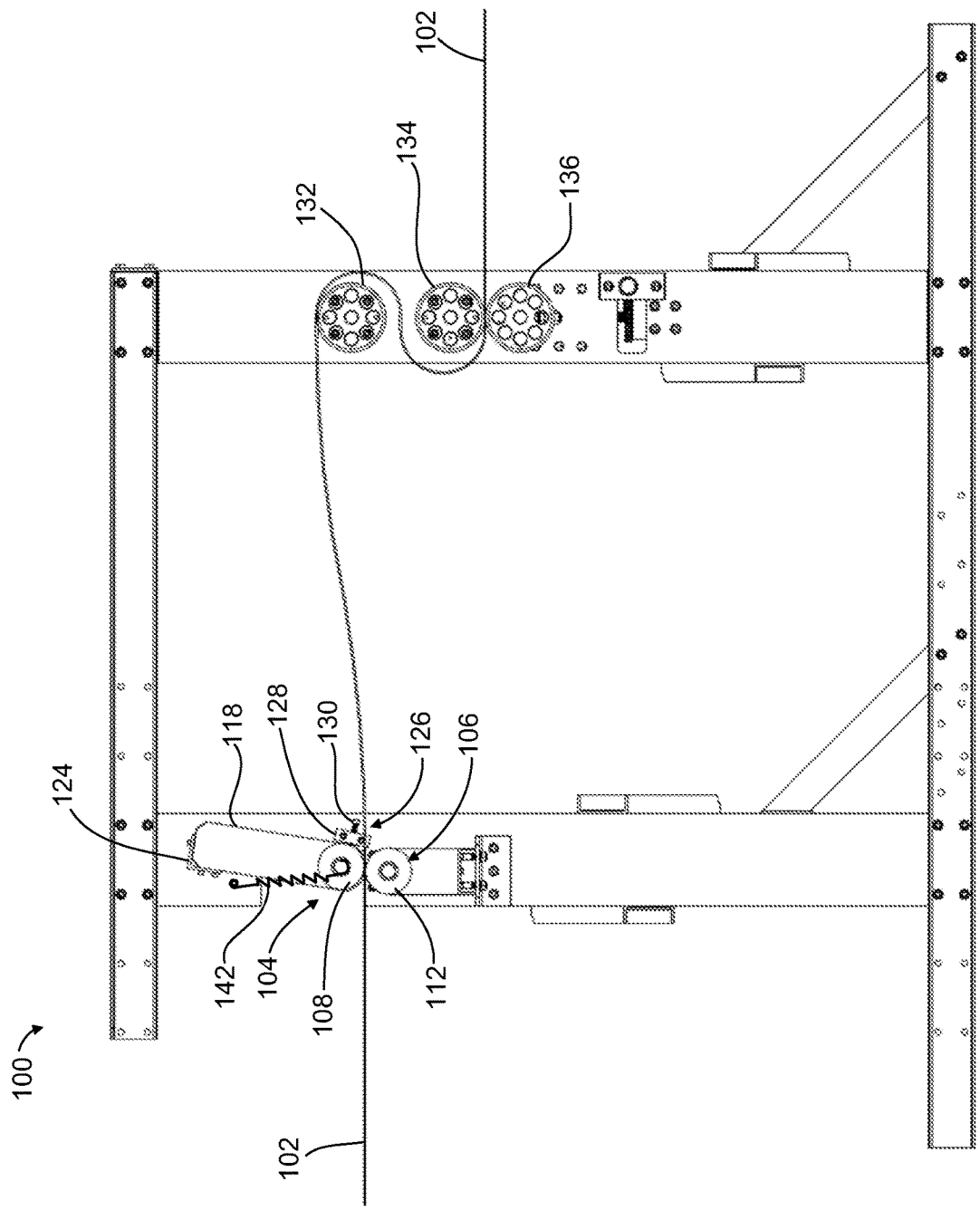
FIG. 1B is a side elevation view of the puller apparatus of FIG. 1A.
Figure 1C:
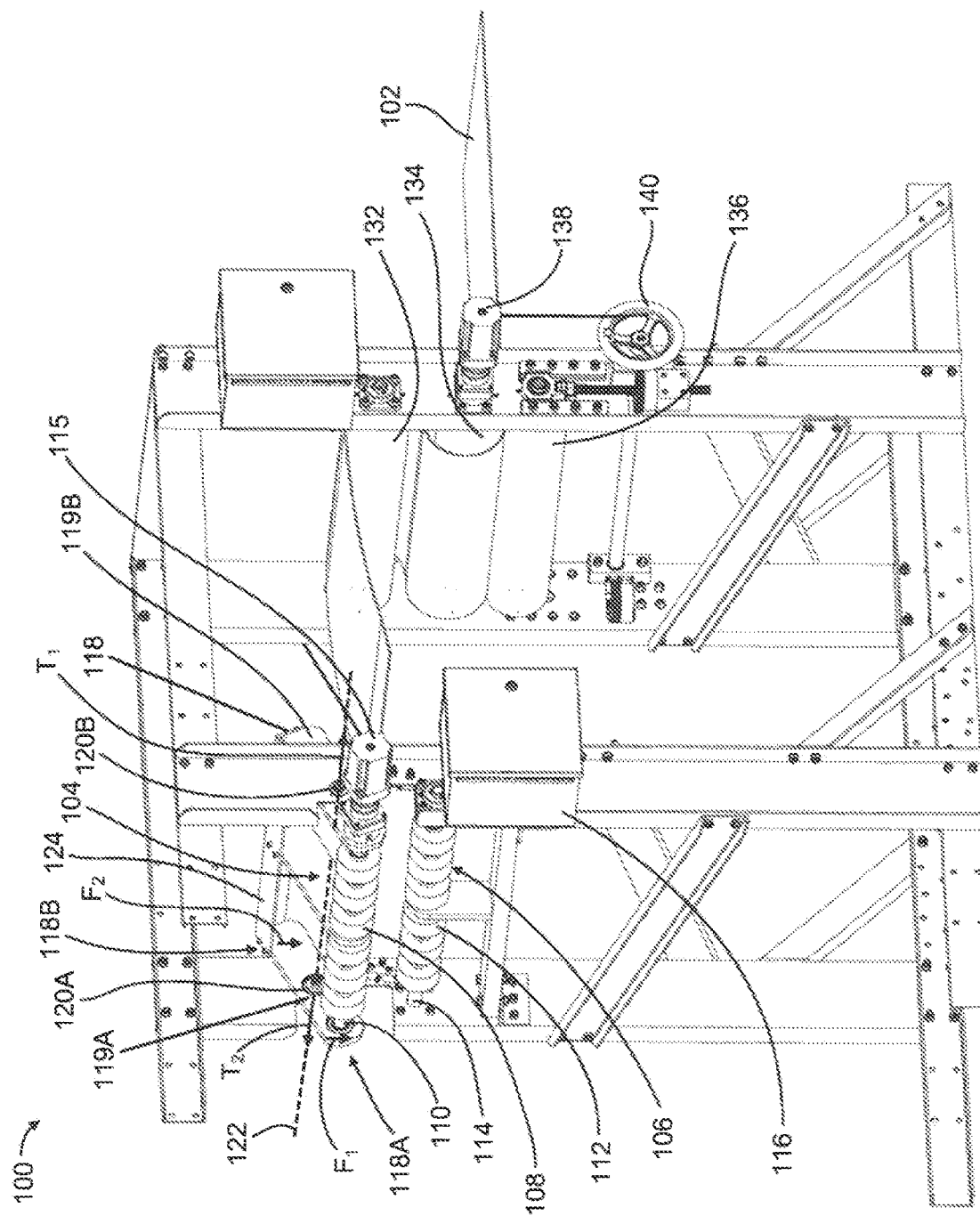
FIG. 1C is a side perspective view of the puller apparatus of FIG. 1A, with the mounting arm in a raised position; and, FIG. 2 is a side perspective view of the puller apparatus of FIG. 1A downstream from an outlet of example extruder.

FIG. 1A-1C illustrate an exemplary puller apparatus, referred to generally as 100, for pulling an extrusion as it emerges from an extruder. The puller apparatus 100 has a path through which the extrusion travels downstream from an outlet of an extruder. For example, the extrusion may be metal, polymer, concrete, ceramics, foodstuff, or other materials suitable for extrusion. In the illustrated example, the extrusion is a plastic sheet 102.

The puller apparatus 100 has an upper extrusion puller member 104 and a lower extrusion puller member 106. As exemplified in FIGS. 1A-1C, the upper and lower extrusion members 104 and 106 define a portion of the path through which the plastic sheet 102 travels. As best shown in FIG. 1B, the plastic sheet 102 is sandwiched between the upper and lower extrusion puller members 104 and 106. The upper and lower extrusion members 104 and 106 have many possible configurations. For example, the upper and lower extrusion members 104 and 106 may be conveyor belts, rotatable shafts, or a combination thereof.

In the illustrated example, the upper extrusion puller member 104 has a plurality of rollers 108 and a rotatable shaft 110 that extends axially through each roller 108. Accordingly, the upper extrusion puller member 104, as exemplified in FIGS. 1A-1C, may be characterized as an upper extrusion puller member assembly 104. The rollers 108 are rotatably secured to the shaft 110. Therefore, rotation of the shaft 110 concurrently rotates the rollers 108.

In this embodiment, shaft 110 is a driven shaft (e.g., driven by motor 115 and may be referred to as a drive shaft). In other embodiments, shaft 110 need not be driven, in which case the rollers may be rotatably mounted to the shaft.

Similarly, in the illustrated example, the lower extrusion puller member 106 has a plurality of rollers 112 and a rotatable shaft 114 that extends axially through each roller 112. Accordingly, the lower extrusion puller member 106, as exemplified in FIGS. 1A-1C, may be characterized as a lower extrusion puller member assembly 106. The rollers 112 are rotatably secured to the shaft 114. Therefore, rotation of the shaft 114 concurrently rotates the rollers 112. In other embodiments, the rollers may be non-rotatably mounted to the shaft.

In the illustrated example, the upper and lower extrusion member assemblies 104 and 106 each have six rollers 108 and 112. In one or more alternative embodiments, each extrusion member assembly 104 and 106 may have more or less rollers 108 and 112. Although the rollers 108 and 112 exemplified in FIG. 1A-1C have substantially the same outer diameter, those skilled in the art will appreciate that this does not have to be the case. For example, in some embodiments, the rollers 108 may have a smaller outer diameter than the rollers 112, or vice versa.

At least one the upper and lower extrusion puller members 104 and 106 may be a drive extrusion puller member. The drive extrusion puller member provides forward motion to the extrusion travelling through the path. In this context, forward motion may be characterized as motion that pulls the extrusion away from the extruder. In such a case, an alternate part of the puller assembly may provide the motive power to advance an extrudate through the puller assembly.

In the illustrated example, the upper extrusion puller member 104 is the drive extrusion puller member. In an alternative embodiment (not shown), the lower extrusion puller member 106 is the drive extrusion puller member. In another alternative embodiment (not shown), both the upper and lower extrusion puller members 104 and 106 are drive extrusion puller members.

In the illustrated example, the upper extrusion puller assembly 104 has a drive motor 115 mounted to the shaft 110 at an end thereof. During operation, the drive motor 115 drives (i.e. turns) the shaft 110 to provide forward motion to the extrusion (e.g. plastic sheet 102). In some embodiments, the drive motor 115 can be reversed to provide rearward motion to the extrusion. For example, the rearward direction may aid in the clearing of extrusion blockages in the path between the upper and lower extrusion puller members 104 and 106. In alternative embodiments in which the lower extrusion puller assembly 106 is a drive extrusion puller member, a drive motor may be mounted thereto. In such embodiments, the drive motor may be mounted to the shaft 114 at an end thereof.

A motor control 116 for controlling operation of the drive motor 115 may be provided. The motor control 116 for controlling operation of the drive motor 115 may be provided at any location and may be mounted to the drive shaft. For example, the motor control 116 may be used to turn the drive motor 115 on and off and/or to adjust the speed of the drive motor 115. In some embodiments (not shown), the drive motor 115 may include a gearbox to provide further control and adjustment of the drive motor 115.

A mounting arm 118 is moveably mounted to the puller apparatus 100. The mounting arm 118 has a pair of laterally spaced apart arm segments 119A, 119B. Each arm segment 119A, 199B has a substantially central mounting location 120A, 120B at which location the mounting arm 118 is moveably mounted to the puller apparatus 100. As exemplified in FIGS. 1A-1C, the mounting arm 118 is pivotally mounted to the puller apparatus 100 at first and second mounting locations 120A and 1208 located on opposite and spaced apart sides the puller apparatus 100. The first and second mounting locations 120A and 1208 define a pivot axis 122 extending therebetween about which the mounting arm 118 is movable. It will be appreciated that the mounting arm 118 may be moveably mounted to a shaft by any means known in the art. For example, it may be moveably mounted along an arcuate track.

The mounting arm 118 has a first portion 118A on one side of the mounting location and a second portion 118B on an opposed side of the mounting location. In the illustrated example, the first portion 118A of the mounting arm 118 is on one side of the pivot axis 122 and the second portion 1186 of the mounting arm 118 is on the other side of the pivot axis 122. It will be appreciated that the length of the first and/or second portions 118A, 1186 may be varied to adjust the amount of force exerted on an extrudate in the puller apparatus.

As exemplified in FIGS. 1A-1C, the upper extrusion puller member assembly 104 is mounted to the first portion 118A of the mounting arm 118. The mounting arm 118 is movable between a lowered position in which the upper extrusion puller member 104 is positioned to engage an extrudate in the path (as exemplified in FIG. 1A) and a raised position in which the upper extrusion puller member 104 is spaced upwardly from the lowered position (as exemplified in FIG. 1C). In such a position, the upper extrusion puller member 104 is spaced from the extrudate in the path. During operation, when in the lowered position, the upper extrusion puller member 104 supplies a drive force to the extrudate that provides forward motion of the extrusion.

With continued reference to FIGS. 1A and 1C, the first portion 118A of the mounting arm 118 travels upwardly and forwardly as the first portion 118A travels from the lowered position of FIG. 1A to the raised position of FIG. 1B.

In the exemplified embodiment, during operation, the mounting arm 118 is freely movable between the lowered position and a raised position spaced upwardly from the lowered position. In other words, the mounting arm 118 is not held in position by, e.g., a telescoping cylinder, a drive motor or the like. Instead, a user may push upwardly on, e.g., the first portion 118A of the mounting arm to move the mounting arm 118 away from engagement with the extrudate. Alternately or in addition, during operation, the mounting arm 118 is moveable between the lowered position (FIG. 1A) and a raised position (e.g. FIG. 1C) merely by applying a downward force to the second portion 118B of the mounting arm 118.

This may provide one or more advantages. For example, this construction may improve the safety of the puller apparatus 100 by facilitating the upper extrusion puller member 104 separating from the lower extrusion puller member 106 when, for example, part of operator's hand or other objects are wedged therebetween. This constructions may simplify removing blockages of the extrusion that may occur between the upper and lower extrusion puller members 104 and 106. In addition, the ability to move the mounting arm 118 to a raised position may simplify aligning the extrusion in the portion of the path defined by the upper and lower extrusion puller members 104 and 106 (as exemplified in FIG. 1C with the plastic sheet 102).

The first portion 118A of the mounting arm 118 may be held in the lowered position by a force applied to the mounting arm 118 which results in the first portion 118A being urged downwardly. For example, the first portion 118A may be heavier than the second portion 118B causing a net downward force being exerted on first portion 118A. Alternately, or in addition, in some embodiments (not shown), the puller apparatus 100 may have a biasing member biasing the mounting arm 118 to the lowered position of FIGS. 1A and 1B. For example, the biasing member may be a spring (see e.g., spring 142 on FIG. 1B), an elastic chord, or the like attached to the first portion 118A and, e.g., a portion of the frame of the puller assembly, which pulls the first portion 118A downwardly. Alternately, a compression spring may be attached to the second portion 118B and, e.g., a portion of the frame of the puller assembly, which pushes the second portion 118B upwardly. This may be a supplement to, or in lieu of, the biasing force produced by a weight provided on mounting arm 118.

The following is a discussion of the exemplified embodiment without a biasing member. In such a case, a net downward force may be exerted on first portion 118A due to the differential weight of the first and second portions 118A, 118B. The first portion 118A of the mounting arm 118 provides a first downward force $F_1$. Similarly, the second portion 118B of the mounting arm 118 provides a second downward force $F_2$. The downward forces $F_1$ and $F_2$ act on opposite sides of the pivot axis 122. In this way, the first and second downward forces $F_1$ and $F_2$ supply opposing first and second torques $T_1$ and $T_2$ along the pivot axis 122. The first torque $T_1$ supplied by the first downward force $F_1$ tends to move the mounting arm 118 from a raised position (e.g. FIG. 1C) to the lowered position (FIG. 1A). Conversely, the torque $T_2$ supplied by the second downward force $F_2$ tends to move the mounting arm 118 from the lowered position (FIG. 1A) to a raised position (e.g. FIG. 1C).

Accordingly, the mounting arm 118 may remain in the lowered position when no external force is applied to the mounting arm 118 and without the mounting arm being locked in a lowered position by, e.g., a telescoping cylinder. To this end, during operation of the puller assembly, the first torque $T_1$ supplied by the first portion 118A is greater than the second torque $T_2$ supplied by the second portion 1186. The difference between the first and second torques ($T_1$-$T_2$) may determine, the drive force supplied to the extrusion by the upper extrusion puller member 104 if the upper extrusion puller member 104 provides a drive force. The drive force may be varied as desired for different types of extrusions. During operation, the greater the first torque $T_1$ is than the second torque $T_2$, the greater the engagement with the extrusion and, accordingly, a higher drive force may be supplied to the extrusion by the upper extrusion puller member 104.

In the illustrated example, the weight of the upper extrusion puller member assembly 104 makes up a significant portion of the first downward force $F_1$ provided by the first portion 118A of the mounting arm 118. In embodiments in which the drive motor 115 is mounted to the upper extrusion member assembly 104, e.g. as shown, the weight of the drive motor 115 contributes to the first downward force $F_1$. As shown in FIG. 1A, the weight of the upper extrusion puller member assembly 104 acts at a distance $D_1$ measured from the pivot axis 122. The distance $D_1$ may be characterized as the "first moment arm".

In some embodiments, as exemplified in FIGS. 1A-1C, the puller apparatus 100 may also have a counterweight 124 provided on the second portion 118B of the mounting arm 118. In such embodiments, the counterweight 124 may make up a significant portion of the second downward force $F_2$ provided by the second portion 118B of the mounting arm 118. As will be described in greater detail below, the second downward force $F_2$ may be varied by varying the weight of the counterweight 124.

Those skilled in the art will appreciate that the counterweight 124 may have many suitable configurations. For example, in FIGS. 1A-1C, the counterweight 124 is a cross member 124 extending between the arm segments 119A, 119B at a distal end of of the second portion 118B. As shown in FIG. 1A, the counterweight 124 acts at a distance D2 from the pivot axis 122. The distance D2 may be characterized as the "second moment arm".

In the illustrated example, the cross member 124 may also function as a "tension release handle". For example, an external downward force may be applied to the end member 124 to move the mounting arm 118 from the lowered position (FIG. 1A) to a raised position spaced upwardly from the lowered position (e.g. FIG. 1C), e.g., a user may press downwardly on it.

In some embodiments (not shown), the position of the counterweight 124 on the second portion 118B of the mounting arm 118 may be adjusted to vary the drive force supplied to the extrusion by the upper extrusion puller member 104 when the mounting arm 118 is in the lowered position. For example, the counterweight 124 may be moveably mounted to the second portion 118B of the mounting arm 118. Those skilled in the art will appreciate that varying the distance $D_2$ (i.e. varying the second moment arm) will concurrently vary the second torque $T_2$ supplied by the second portion 118B along pivot axis 122. Accordingly, in such embodiments, the counterweight 124 can be movable in relation to the pivot axis 122 to vary the drive force supplied to the extrusion by the upper extrusion puller member 104 when the mounting arm 118 is in the lowered position.

In some embodiments, the counterweight 124 is replaceable with an alternate counterweight having a different weight than the previous counterweight 124. As a result, the alternate counterweight may be used to vary the second downward force $F_2$, thereby varying the second torque $T_2$ supplied by the second portion 118B along the pivot axis 122. Accordingly, in such embodiments, the alternate counterweight may be used to vary the drive force supplied to the extrusion by the upper extrusion puller member 104 when the mounting arm 118 is in the lowered position. For example, the counterweight 124 may be removably mounted to the second portion 118B of the mounting arm 118 in such a way that permits the counterweights to be interchanged.

Alternately, or in addition (not shown), one or more supplemental counterweights weight may be positioned on the second portion 118B of the mounting arm 118 to increase the second downward force $F_2$, thereby increasing the second torque $T_2$ supplied by the second portion 118B along the pivot axis 122. Accordingly, in such embodiments, the supplemental counterweight may be added to reduce the drive force supplied to the extrusion by the upper extrusion puller member 104 when the mounting arm 118 is in the lowered position.

Alternately, or in addition (not shown), one or more supplemental counterweights weight may be positioned on the first portion 118A of the mounting arm 118 to increase the first downward force $F_1$, thereby increasing the first torque $T_1$ supplied by the first portion 118A along the pivot axis 122. Accordingly, in such embodiments, the supplemental counterweight may be added to increase the drive force supplied to the extrusion by the upper extrusion puller member 104 when the mounting arm 118 is in the lowered position.

The puller apparatus 100 may have a stop member 126 for determining the lowered position, as exemplified in FIG. 1B. In the illustrated example, the stop member 126 has a stop 128 and an optional adjustment dial 130 extending therefrom. As shown in FIG. 1B, when the mounting arm 118 engages the stop 128, the stop 128 inhibits the mounting arm 118 from traveling rearwardly and downwardly. Turning the optional adjustment dial 130 may vary the stop position by, e.g., varying the angle of the stop 128 relative to the vertical, thereby adjusting the position of the stop 128 and, in turn, determining the lowered position. Those skilled in the art will appreciate that many other ways of adjusting the position of the stop 128 are possible. The position of the stop 128 may be adjusted to accommodate for extrusions of different thickness and/or to vary the drive force supplied to extrusion by the upper extrusion puller member 104 when the mounting arm 118 is in the lowered position.

In some embodiments (not shown), the position of the mounting location (e.g. mounting locations 120A and 120B) may be varied. For example, the mounting arm 118 may have parallel and elongate slots defined in opposite sides of thereof. In such embodiments, mounting fasteners may pass through respective slots to engage the puller apparatus 100. When the mounting fasteners are loosely engaged to the puller apparatus 100, the mounting fasteners may be slid along corresponding slots to vary the mounting location. Once positioned as desired, the mounting fasteners may be tightened to retain the mounting arm in the new mounting location.

In the illustrated example, varying the mounting locations 120A and 120B shifts the pivot axis 122. Shifting the pivot axis 122 may vary the drive force supplied to the extrusion by the upper extrusion puller member 104 when the mounting arm 118 is in the lowered position. This is because shifting the pivot axis 122 varies the first and second moment arms (i.e. adjusting the distance $D_1$ and distance $D_2$ shown in FIG. 1A) which, in response, varies the first and second torques $T_1$ and $T_2$. Those skilled in the art will appreciate that increasing a movement arm will increase the torque supplied by given force.

Along the same lines, the mounting location may also be varied to determine the lowered position. In the illustrated example, varying the mounting locations 120A and 120B, e.g. as described above, may vary the position of the lowered position, e.g., it may be moved forwardly or rearwardly. In such embodiments, additional alignment means may be provided to align the lower extrusion puller member 106 with the upper extrusion puller member 104.

Optionally, as exemplified, the puller apparatus 100 may also have additional members (upstream and/or downstream from the upper and lower extrusion puller members 104 and 106) that define the path through the apparatus. In the exemplified embodiment, the additional members comprise a tension member 132, an upper nip member 134, and a lower nip member 136. The tension member 132, the upper nip member 134 and the lower nip member 136 define a portion of the path upstream from the upper and lower extrusion puller members 104 and 106. As shown, the upper nip member 134 is optionally driven by an upper nip drive motor 138 to provide forward motion to the extrusion traveling through the path. In an alternative embodiment, the lower nip member 136 may be driven by a lower nip drive motor. In another alternative embodiment, neither the upper nip member 134 nor the lower nip member 136 are driven.

As exemplified in FIGS. 1A-1C, the tension member 132, the upper nip member 134 and the lower nip member 136 are rollers. In one more alternative embodiments, the tension member 132, the upper nip member 134 and the lower nip member 136 may be conveyor belts, or a combination of conveyor belts and rollers.

The upper and lower nip members 134 and 136 define a gap therebetween. The gap may be adjustable (e.g. for extrusions of different thickness) by rotating an optional nip adjustment member 140. As exemplified in FIGS. 1A and 1C, the nip adjustment member 140 is a rotatable wheel 140. Turning the wheel 140 moves the lower nip member 136 vertically relative to the upper nip member 134, thereby varying the gap defined therebetween.

Those skilled in the art will understand that the tension member 132, the upper nip member 134 and the lower nip roll member 136 may have many alternative arrangements with more or less components. The specific arrangement may depend on the type of material extruded. In some embodiments, the extrusion may travel directly to the upper and lower extrusion puller members 104 and 106 downstream from the extruder (i.e. avoiding the need of the tension member 132, the upper nip member 134 and the lower nip member 136 altogether).

Figure 2:
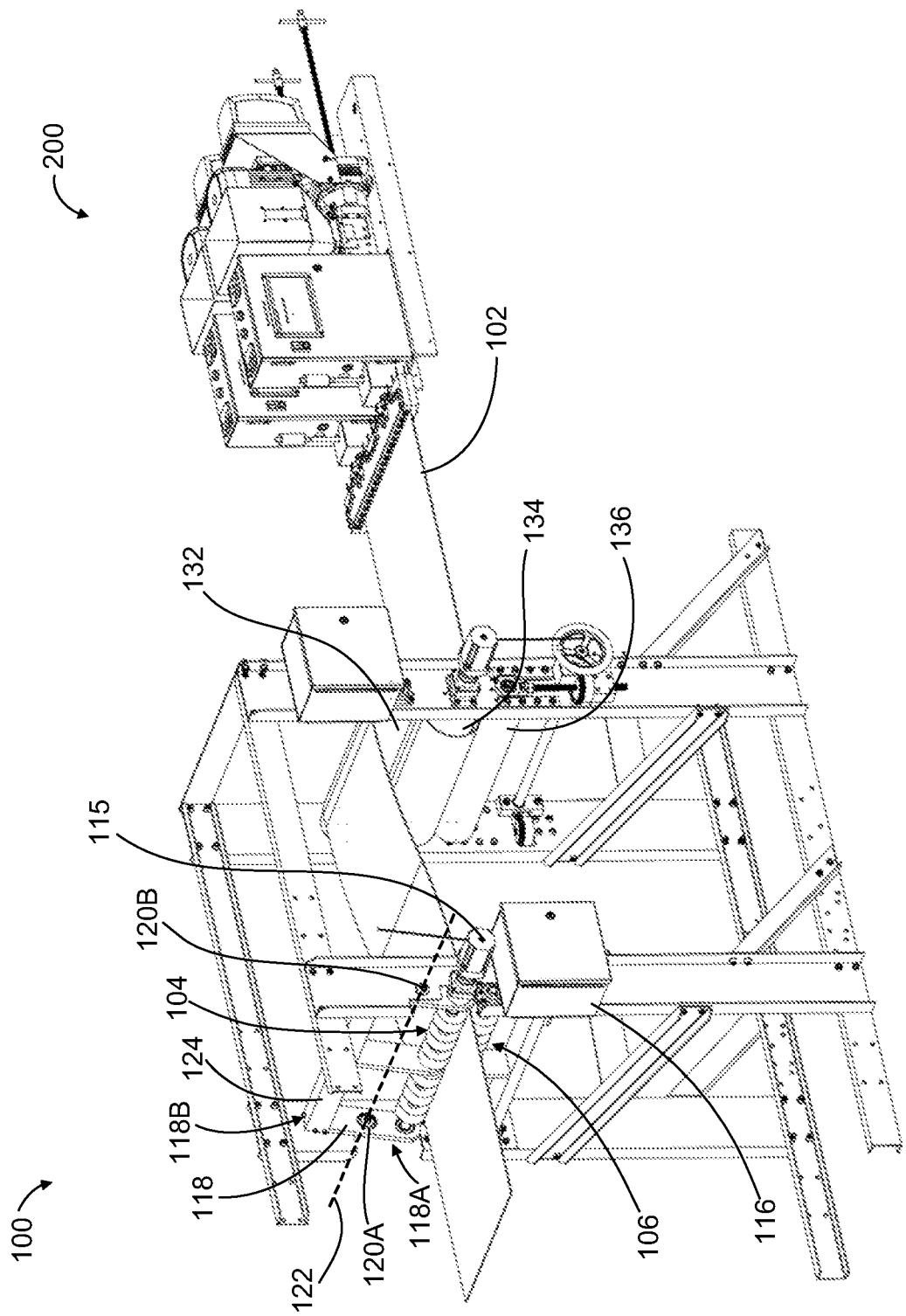

Referring to FIG. 2, the puller apparatus 100 of FIGS. 1A-1C is positioned downstream of an example extruder, referred to generally as 200. In the illustrated example, the extruder 200 is extruding the plastic sheet 102 from an outlet thereof. As described above, the plastic sheet 102 is one of many possible extrusion materials. In the illustrated example, the plastic sheet 102 is fed into the puller apparatus 100 between the upper and lower nip members 134 and 136. The drive extrusion puller member (the upper extrusion puller member 104 in the illustrated example) of the puller apparatus 100 provides forward motion to the plastic sheet 102 to pull it through the path.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A puller apparatus for pulling an extrusion profile as it emerges from an extruder, the puller apparatus comprising:
    a) a path through which an extrusion profile travels downstream from an outlet of an extruder;
    b) an upper nip member and a lower nip member defining a first portion of the path, wherein the upper and lower nip members are spaced apart by a gap sized to accommodate a thickness of the extrusion profile travelling in the path;
    c) an upper extrusion puller member and a lower extrusion puller member defining a second portion of the path downstream from the first portion of the path, wherein at least one of the extrusion puller members is a drive extrusion puller member, the drive extrusion puller member providing forward motion to the extrusion profile travelling through the path, and wherein, in operation, the extrusion profile has a lower temperature at the second portion of the path than the first portion of the path; and,
    d) a mounting arm moveably mounted to the puller apparatus, the mounting arm having a pair of laterally spaced apart arm segments, each arm segment having a substantially central mounting location at which location the mounting arm is moveably mounted to the puller apparatus, the mounting arm having a first portion on one side of the substantially central mounting locations and a second portion on an opposed side of the substantially central mounting locations, the first portion is mounted to the upper extrusion puller member, the second portion having a laterally extending cross member spanning the arm segments,
    wherein the mounting arm is moveable from a lowered position in which the upper extrusion puller member is positioned to engage the extrusion profile in the path and a raised position in which the upper extrusion puller member is spaced upwardly from the lowered position,
    wherein the second portion of the mounting arm is unconnected to any portion of the puller apparatus other than a part of the mounting arm whereby, during operation the mounting arm is freely moveable between the lowered position and the raised position,
    wherein the first portion of the mounting arm travels upwardly and forwardly as the mounting arm travels from the lowered position to the raised position, and
    wherein the mounting arm is moveable from the lowered position to the raised position by applying an external force to the cross member.

2. The puller apparatus of claim 1, wherein moving the mounting arm from the lowered position to the raised position during operation consists of i) applying a downward force to the second portion of the mounting arm or ii) applying an upward force to the first portion of the mounting arm.

3. The puller apparatus of claim 1, wherein the mounting arm is pivotally mounted to the puller apparatus.

4. The puller apparatus of claim 1, further comprising an additional weight positionable on the mounting arm whereby a downward force provided by the additional weight is variable.

5. The puller apparatus of claim 1, wherein the second portion of the mounting arm provides a downward force.

6. The puller apparatus of claim 5, wherein a position of the substantially central mounting location of each arm segment is variable whereby the downward force is variable.

7. The puller apparatus of claim 1, further comprising a biasing member biasing the mounting arm to the lowered position.

8. The puller apparatus of claim 1, further comprising a stop member comprising a stop, whereby the stop determines the lowered position.

9. The puller apparatus of claim 8, wherein a position of the stop is adjustable.

10. The puller apparatus of claim 1, wherein the upper extrusion puller member is the drive extrusion puller member.

11. The puller apparatus of claim 10, wherein a drive motor is mounted to the upper extrusion puller member.

12. The puller apparatus of claim 1, wherein the upper extrusion puller member comprises a plurality of spaced apart rollers.

13. The puller apparatus of claim 11, wherein the drive motor is reversible to provide rearward motion to the extrusion profile.

14. The puller apparatus of claim 1, wherein the puller apparatus has an absence of a telescoping cylinder coupled to the mounting arm.

15. An extrusion system comprising:
a) an extruder having an extruder outlet, the extruder configured to extrude an extrusion profile from the extruder outlet; and
b) a puller apparatus positioned downstream of the extruder outlet, the puller apparatus comprising:
   i) a path through which the extrusion profile travels downstream from the extruder outlet;
   ii) an upper extrusion puller member and a lower extrusion puller member defining a first portion of the path wherein at least one of the extrusion puller members is a drive extrusion puller member, the drive extrusion puller member providing forward motion to the extrusion profile travelling through the path; and
   iii) a mounting arm moveably mounted to the puller apparatus, the mounting arm having a a pair of laterally spaced apart arm segments, each arm segment having a substantially central mounting location at which location the mounting arm is moveably mounted to the puller apparatus, the mounting arm having a first portion on one side of the substantially central mounting locations and a second portion on an opposed side of the substantially central mounting locations, the first portion is mounted to the upper extrusion puller member, the second portion having a laterally extending cross member spanning the arm segments,
wherein the mounting arm is moveable from a lowered position in which the upper extrusion puller member is positioned to engage the extrusion profile in the path and a raised position in which the upper extrusion puller member is spaced upwardly from the lowered position,
wherein the second portion of the mounting arm is unconnected to any portion of the puller apparatus other than a part of the mounting arm whereby, during operation the mounting arm is freely moveable between the lowered position and the raised position,
wherein the first portion of the mounting arm travels upwardly and forwardly as the mounting arm travels from the lowered position to the raised position, and
wherein the mounting arm is moveable from the lowered position to the raised position by applying an external force to the cross member.

* * * * *